(12) United States Patent
Kai et al.

(10) Patent No.: US 10,261,520 B2
(45) Date of Patent: Apr. 16, 2019

(54) MOTOR CONTROLLER AND INDUSTRIAL MACHINE

(71) Applicant: Mitsubishi Electric Corporation, Chiyoda-ku (JP)

(72) Inventors: Takashi Kai, Tokyo (JP); Hiroyuki Sekiguchi, Tokyo (JP); Hidetoshi Ikeda, Tokyo (JP); Shigeo Amigasaya, Tokyo (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 28 days.

(21) Appl. No.: 15/548,191

(22) PCT Filed: Feb. 2, 2016

(86) PCT No.: PCT/JP2016/053095
§ 371 (c)(1),
(2) Date: Aug. 2, 2017

(87) PCT Pub. No.: WO2016/125804
PCT Pub. Date: Aug. 11, 2016

(65) Prior Publication Data
US 2018/0024572 A1 Jan. 25, 2018

(30) Foreign Application Priority Data

Feb. 4, 2015 (JP) ................................. 2015-020425

(51) Int. Cl.
*G05D 3/12* (2006.01)
*H02P 29/40* (2016.01)
(Continued)

(52) U.S. Cl.
CPC ............... *G05D 3/12* (2013.01); *G05B 19/00* (2013.01); *H02P 23/20* (2016.02); *H02P 29/40* (2016.02); *H02P 2205/07* (2013.01)

(58) Field of Classification Search
CPC .................................. G05D 3/12; H02P 29/40
(Continued)

(56) References Cited

U.S. PATENT DOCUMENTS

2004/0183494 A1 9/2004 Nagaoka et al.
2009/0224717 A1* 9/2009 Sawaragi ................. G05B 5/01
318/610
2013/0057186 A1* 3/2013 Tanabe ..................... H02P 23/30
318/400.15

FOREIGN PATENT DOCUMENTS

JP 05-189050 A 7/1993
JP 05-250041 A 9/1993
(Continued)

OTHER PUBLICATIONS

Tsuchimoto, et al., "*Robust Vibration Control Using Machine Stand Acceleration Signal in Linear-Motor-Driven Table Systems*", The Institute of Electrical Engineers of Japan, Industry Instrumentation and Control Research Society, IIC-11-111, 2011, pp. 91-96 (with English Abstract).

(Continued)

*Primary Examiner* — Kawing Chan
*Assistant Examiner* — Bradley Brown
(74) *Attorney, Agent, or Firm* — Oblon, McClelland, Maier & Neustadt, L.L.P.

(57) ABSTRACT

A motor controller includes: an error suppression compensation unit that outputs an error suppression signal for driving the motor such that a difference between the position command signal and a signal based on the motor position signal equals zero; an acceleration extraction unit that outputs an acceleration component of a natural frequency of a stand from a stand vibration signal; an acceleration compensation unit that outputs a proportional compensation signal obtained by multiplying the stand acceleration signal by a proportional gain; a machine end correction unit that (Continued)

outputs a machine end correction signal, and decreases an amplitude of vibration at the machine end relative position; and an addition unit that outputs a signal obtained by adding the machine end correction signal to the error suppression signal.

11 Claims, 7 Drawing Sheets

(51) Int. Cl.
*H02P 23/20* (2016.01)
*G05B 19/00* (2006.01)

(58) Field of Classification Search
USPC .......................................................... 318/615
See application file for complete search history.

(56) References Cited

FOREIGN PATENT DOCUMENTS

| | | | |
|---|---|---|---|
| JP | 2004-21413 A | 1/2004 |
| JP | 2004-272883 A | 9/2004 |
| JP | 2007-154980 A | 6/2007 |
| JP | 2009-217329 A | 9/2009 |
| JP | 2009-281533 A | 12/2009 |
| JP | 2010-207011 A | 9/2010 |

OTHER PUBLICATIONS

International Search Report dated Apr. 26, 2016 in PCT/JP2016/053095, filed Feb. 2, 2016.

* cited by examiner ical machine.

MOTOR CONTROLLER AND INDUSTRIAL MACHINE

FIELD

The present invention relates to a motor controller that controls a motor mounted on a stand and to an industrial machine.

BACKGROUND

A motor controller for use in motor control is heavily used in industrial machines such as an electronic packaging machine, semiconductor manufacturing equipment, a machine tool, and a machine used in the field of factory automation and robotics. The motor controller can include a feedforward controller that calculates an operation command signal on the basis of an arbitrary positioning command and a mathematical model of a controlled object, and a feedback controller that reduces an error signal obtained by subtracting an angle of rotation or a position signal of the motor from the operation command signal. Such a motor controller enables a movable part including a working machine such as a robot hand attached to the motor to perform positioning at high speed and with high precision.

The motor is set up on a stand or machine stand of the industrial machine where, when the stand or machine stand has low stiffness, vibration of the stand accompanying reaction force of the motor causes a decrease in the positioning performance of the movable part attached to the motor. The motor controller can thus be equipped with a vibration suppression compensator, which is also referred to as a command filter or pre-filter (Patent Literature 1). The vibration suppression compensator operates the operation command signal on the basis of a natural frequency and an attenuation coefficient of the stand or machine stand in order to drive the motor while suppressing vibration of the stand or machine stand.

The natural frequency of the stand or machine stand varies depending on the installation environment of the entire industrial machine or the attitude of a controlled object. Accordingly, a true value of a control parameter set in the vibration suppression compensator varies depending on a positioning site so that the effect of vibration suppression cannot be fully achieved. Now, in order to compensate for the reduction in robustness against the change in the true value of the parameter, Patent Literature 1 proposes machine stand acceleration feedback. The machine stand acceleration feedback is performed such that a signal detected by an acceleration sensor installed on the stand or machine stand is subjected to filtering with a band pass characteristic that allows a signal in an arbitrary frequency band to pass as well as an adjustment using a proportional gain, and then the signal is fed back as driving force of the motor.

Patent Literature 2 proposes surface plate acceleration feedback for an X-Y stage positioning apparatus including a liner motor mounted on a vibration isolator that is treated as a surface plate. While considering the mass of a movable part driven by an X-Y stage and the gain of a power amplifier, the surface plate acceleration feedback is performed such that a signal from an acceleration sensor installed on the vibration isolator is subjected to filtering with a low-pass characteristic or band pass characteristic as well as an adjustment using a proportional gain, and then the signal is fed back as driving force of the motor.

CITATION LIST

Patent Literature

Patent Literature 1: Japanese Patent Application Laid-Open No. 2010-207011
Patent Literature 2: Japanese Patent Application Laid-Open No. H5-189050

Non-Patent Literature

Non-Patent Literature 1: Tsuchimoto, Y., Seki, K., Iwasaki, M., "Robust Vibration Control Using Machine Stand Acceleration Signal in Linear-Motor-Driven Table Systems", The Institute of Electrical Engineers of Japan, Industry Instrumentation and Control Research Society, IIC-11-111, (2011), pp. 91-96. (fourth row in right column to 15th row in right column on p. 91)

SUMMARY

Technical Problem

The industrial machine in some cases adopts a structure in which the movable part driven by the motor is suspended in the air with respect to the stand. The industrial machine adopting such a structure is required to decrease the amplitude of vibration at a machine end relative position rather than the amplitude of vibration at a motor position. The motor position corresponds to a relative position between a mover of the motor connected to one end of the movable part and a stator of the motor mounted on the stand. The machine end relative position corresponds to a relative position between a work object and a part of a working machine attached to the movable part to operate on the work object.

When the vibration suppression compensator is adopted as a way to decrease these amplitudes of vibration, a notch filter is inserted to remove a component corresponding to the natural frequency of the stand from the operation command signal calculated by the feedforward controller. The motor controller can thus drive the motor while decreasing the occurrence of absolute vibration of the stand, namely decreasing the amplitudes of vibration at both the motor position and the machine end relative position simultaneously. However, the natural frequency of the stand varies depending on the installation environment of the industrial machine or the attitude of the controlled object. This causes reduction in the robustness against the change in the true value of the control parameter set to the vibration suppression compensator, whereby the amplitudes of vibration at the motor position and the machine end relative position cannot be decreased depending on the positioning site.

The robustness against a change in the attitude of the controlled object can be made higher in a case where the machine stand acceleration feedback or the surface plate acceleration feedback is adopted than in a case where the vibration suppression compensator is adopted. A compensator according to Patent Literature 2 can decrease the amplitude of vibration at the motor position. When the stand vibrates in a rocking mode, however, the compensator according to Patent Literature 2 can less effectively decrease the vibration at the machine end relative position. The stand vibrating in the rocking mode has different vibration characteristics at a site where the stator of the motor is installed and a site where the work object is installed.

An object of the present invention is to provide a motor controller that can decrease the amplitude of vibration at a relative position between a work object of a working machine connected to a movable part of a motor and a part of the working machine operating on the work object.

Solution to Problem

In order to solve the aforementioned problem and achieve the object, a motor controller according to the present invention controls a machine end relative position on the basis of a position command signal that determines the position of a mover of a motor and a motor position signal that is a piece of information on a motor position that is a relative position between a stator and the mover of the motor, in which the machine end relative position is a relative position between a work object mechanically connected to the stator and a part of a working machine mechanically connected to the mover in order to operate on the work object. The motor controller according to the present invention includes an error suppression compensation unit, an acceleration extraction unit, an acceleration compensation unit, a machine end correction unit, and an addition unit. The error suppression compensation unit outputs an error suppression signal for driving the motor such that a difference between a position command signal and a signal based on a motor position signal equals zero. The acceleration extraction unit outputs, as a stand acceleration signal, an acceleration component of a natural frequency of a stand from a stand vibration signal that is a piece of information on vibration of the stand on which the stator of the motor is mounted. The acceleration compensation unit outputs a proportional compensation signal obtained by multiplying the stand acceleration signal by a proportional gain. The machine end correction unit outputs a machine end correction signal obtained by changing at least the amplitude of the proportional compensation signal in response to a change in a machine end adjustment parameter input from the outside, increases the amplitude of vibration at the motor position, and then decreases the amplitude of vibration at the machine end relative position. The addition unit outputs a signal obtained by adding the machine end correction signal to the error suppression signal as a driving signal of the motor.

Advantageous Effects of Invention

According to the present invention, there can be provided the motor controller that can decrease the amplitude of vibration at the relative position between the work object of the working machine connected to the movable part of the motor and the part of the working machine operating on the work object.

DESCRIPTION OF EMBODIMENTS

A motor controller and an industrial machine according to an embodiment of the present invention will now be described in detail with reference to the drawings. Note that the present invention is not limited to the embodiment.

First Embodiment

Figure 1:
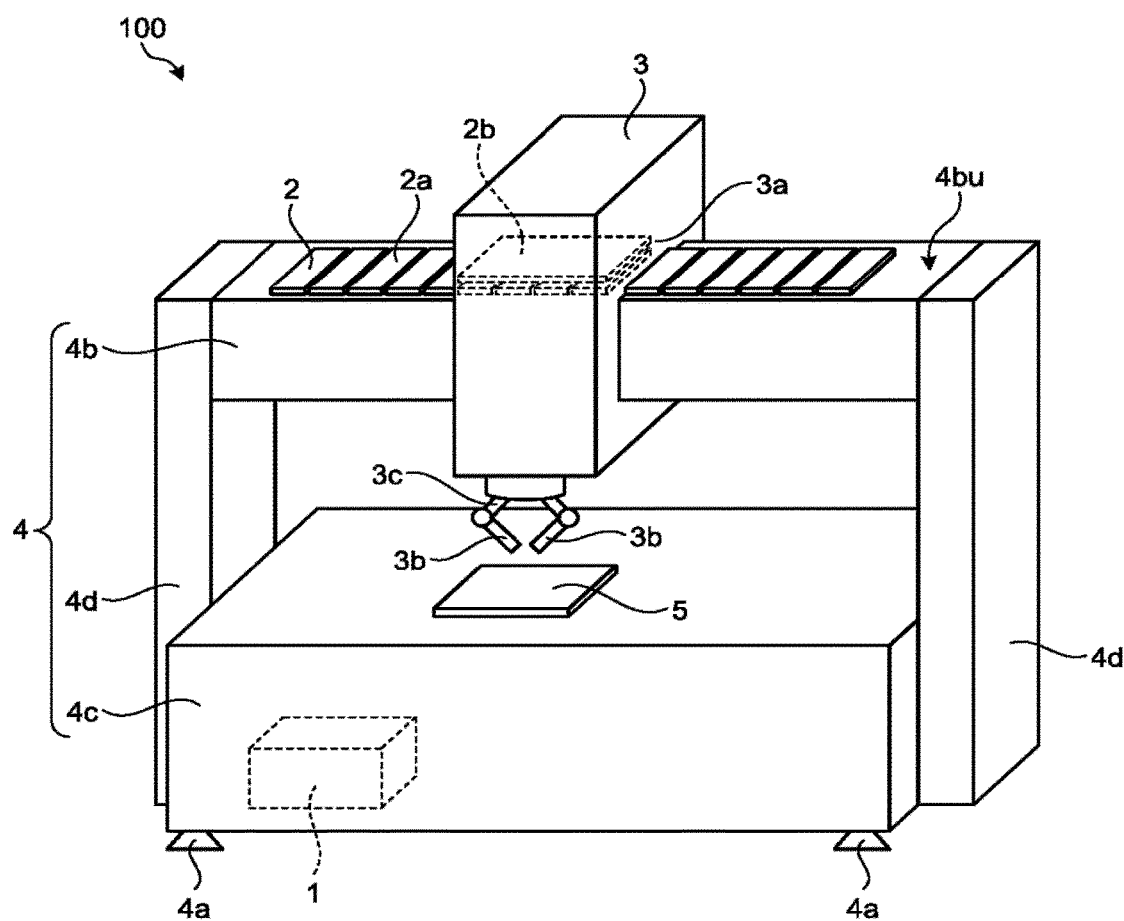
FIG. 1 is a perspective view illustrating an industrial machine equipped with a motor controller according to a first embodiment.

FIG. 1 is a perspective view illustrating an industrial machine equipped with a motor controller according to a first embodiment. An industrial machine 100 includes a motor 2; a stand 4 holding the motor 2; a working machine 3c attached to a movable part 3 of the motor 2; and a motor controller 1 controlling the motor 2. The motor 2 includes a stator 2a that is linear and extends in one direction as well as a mover 2b moving in the direction of the extension of the stator 2a or along the longitudinal direction of the stator 2a. The motor 2 is a linear motor in the first embodiment. The motor 2 is not limited to being a linear motor but can be a rotary motor that includes an annular stator and a rotor that rotates inside the stator.

The mover 2b is connected to the movable part 3. The movable part 3 includes the working machine 3c. The working machine 3c of the first embodiment is a robot hand but it can also be a tool. The movable part 3 is connected to the mover 2b at a motor end 3a. When the motor 2 is in operation, the movable part 3 moves along the longitudinal direction of the stator 2a together with the mover 2b. When the working machine 3c is a robot hand, it grips a part with a machine end 3b and places the part on a work object 5 such as a substrate. When the working machine 3c is a tool, it performs machining on a metallic material to be machined, which is the work object 5. The work object 5 is not limited to being a substrate on which the part is placed nor a material to be machined by the tool as described above. The machine end 3b is a part of the working machine 3c operating on the work object 5.

The stand 4 is supported by a plurality of leveling bolts 4a. The stand 4 includes an upper stand 4b, a lower stand 4c, and a frame 4d. The upper stand 4b is a bar-like structure. The stator 2a of the motor 2 is mounted on an upper surface 4bu of the upper stand 4b. The mover 2b is placed over the stator 2a. A pair of frames 4d is attached to the lower stand 4c. The pair of frames 4d and 4d supports both ends of the upper stand 4b. Such a structure causes the lower stand 4c to support the upper stand 4b through the pair of frames 4d and 4d.

The upper stand 4b passes through the movable part 3. Such a structure allows the stand 4 to support the working machine 3c of the movable part 3 in the air. The working machine 3c can perform work while being suspended in the air by the stand 4. The work object 5 is fixed on the lower stand 4c, which is mechanically connected to the stator 2a of the motor 2. That is, the work object 5 is mechanically connected to the stator 2a of the motor 2 via the lower stand 4c. The work object 5 is also called a workpiece. The work object 5 is the substrate on which the part gripped by the working machine 3c is placed, or it is the material to be machined by the working machine 3c functioning as a tool.

The motor controller 1 controls the operation of the motor 2 included in the industrial machine 100. The motor controller 1 will now be described.

Figure 2:
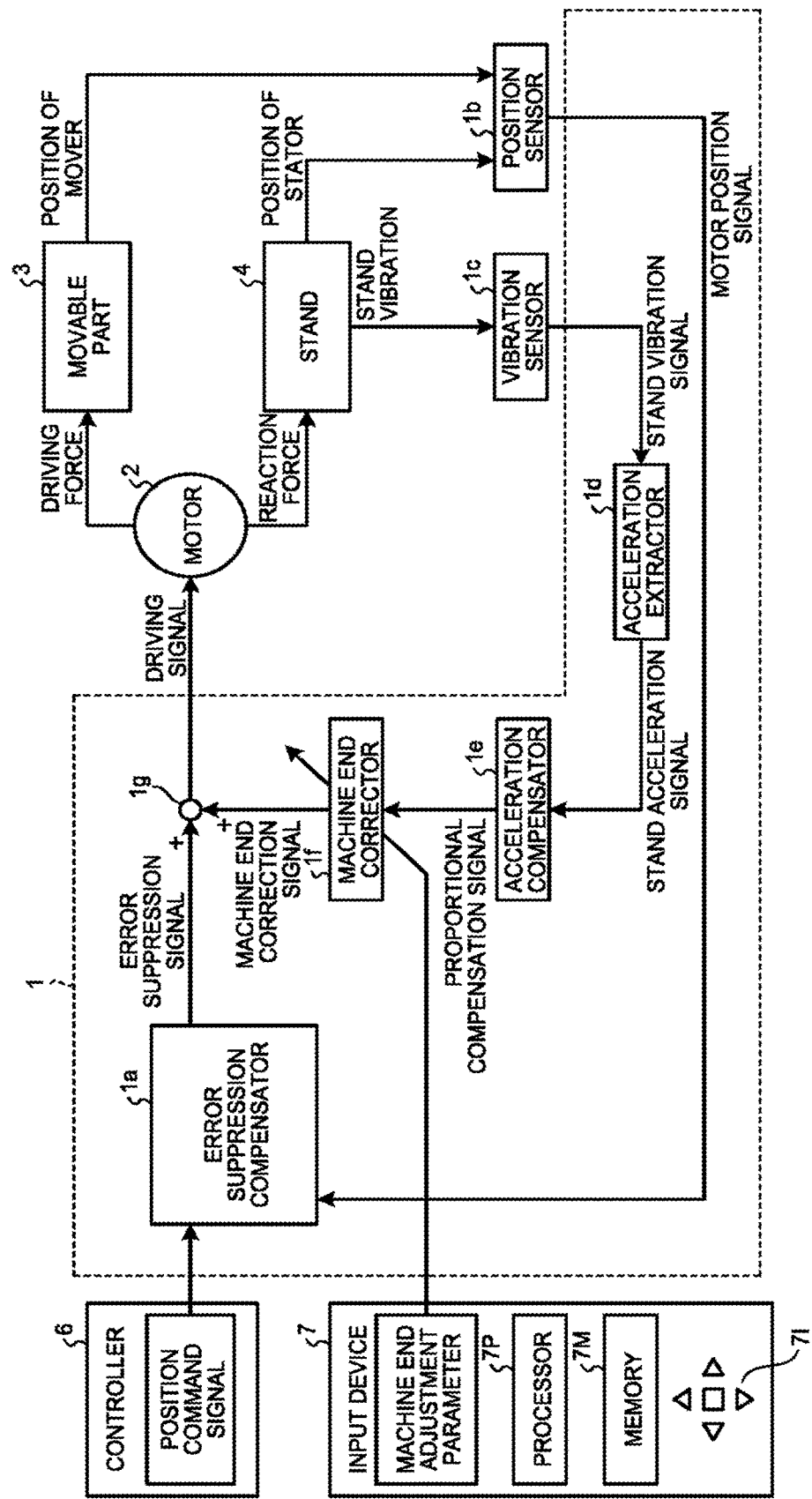
FIG. 2 is a diagram illustrating the configuration of the motor controller according to the first embodiment.

FIG. 2 is a diagram illustrating the configuration of the motor controller according to the first embodiment. The motor controller 1 is a controller that controls the machine end relative position on the basis of a position command signal that determines the position of the mover 2b of the motor 2 and also on the basis of a motor position signal that is information on the motor position that is the relative position between the stator 2a and the mover 2b of the motor 2; in which the machine end relative position is a relative position between the work object 5, which is mechanically connected to the stator 2a, and the machine end 3b of the working machine 3c, which is mechanically connected to the mover 2b in order to operate on the work object 5.

The motor controller 1 includes an error suppression compensator 1a, an acceleration extractor 1d, an acceleration compensator 1e, a machine end corrector 1f, and an adder 1g. The error suppression compensator 1a is an error suppression compensation unit that outputs an error suppression signal for driving the motor 2 such that a difference between the position command signal and the motor position signal equals zero. The acceleration extractor 1d is an acceleration extraction unit that outputs, as a stand acceleration signal, an acceleration component of the natural frequency of the stand 4 from a stand vibration signal, which is information on the vibration of the stand 4 on which the stator 2a of the motor 2 is mounted. The acceleration compensator 1e is an acceleration compensation unit that outputs a proportional compensation signal obtained by multiplying the stand acceleration signal by a proportional gain. The machine end corrector 1f is a machine end correction unit that outputs a machine end correction signal obtained by changing the amplitude and phase of the proportional compensation signal; increases the amplitude of vibration at the motor position; and then decreases the amplitude of vibration at the machine end relative position. The adder 1g is an addition unit that outputs, as a driving signal for the motor 2a, a signal obtained by adding the machine end correction signal to the error suppression signal.

The position command signal is a signal commanding the position of the stator 2a of the motor 2. The position command signal of the first embodiment is generated by a controller 6 that controls the industrial machine 100 illustrated in FIG. 1. The controller 6 controls a machine equipped with the motor 2. The controller 6 of the first embodiment is a programmable logic controller (PLC) but is not limited thereto. Once the position command signal is input to the motor controller 1, the error suppression compensator 1a generates the error suppression signal calculated on the basis of the position command signal that is input and the motor position signal such that a position error signal that is the difference or the error between the position command signal and the motor position signal approaches zero. The position error signal can be obtained by subtracting the motor position signal from the position command signal or subtracting the position command signal from the motor position signal. The error suppression compensator 1a outputs the error suppression signal that is generated to the adder 1g. The motor position signal is information on the motor position, which is the relative position between the mover 2b and the stator 2a of the motor 2. The motor position signal is detected by a position sensor 1b. The position sensor 1b of the first embodiment is an encoder but is not limited thereto.

A vibration sensor 1c is mounted to the stand 4. The vibration sensor 1c of the first embodiment is an acceleration sensor but is not limited thereto. The vibration sensor 1c detects the motion of the stand 4 that vibrates and outputs a stand vibration signal. The acceleration extractor 1d outputs a stand acceleration signal obtained by extracting the acceleration component of the natural frequency of the stand 4. The acceleration compensator 1e outputs the proportional compensation signal by multiplying the stand acceleration signal by the proportional gain corresponding to inertia of the movable part 3.

The machine end corrector 1f receives as input the proportional compensation signal from the acceleration compensator 1e. The machine end corrector 1f generates the machine end correction signal and outputs the signal to the adder 1g, the machine end correction signal being generated by changing the amplitude and phase of the proportional compensation signal such that a transfer function of the machine end corrector 1f has a characteristic determined by using a machine end adjustment parameter. The machine end adjustment parameter is a numerical value input from outside the motor controller 1 and is used to adjust the position of the machine end 3b of the working machine 3c. In the first embodiment, the machine end adjustment parameter is obtained outside the machine end corrector 1f or outside the motor controller 1 in the first embodiment and is input to the machine end corrector 1f, but it can be generated inside the motor controller 1 as well.

In the first embodiment, the machine end adjustment parameter is input to the machine end corrector 1f from an input device 7 that changes the machine end adjustment parameter. The input device 7 of the first embodiment is a computer including a processor 7P, a memory 7M, and an input unit 7I. The input unit 7I of the first embodiment is an input key but is not limited thereto. To change the machine end adjustment parameter, an operator of the industrial machine 100 uses the input unit 7I to input, to the input device 7, a machine end adjustment parameter to be changed and a value after changed. The processor 7P changes the value of the machine end adjustment parameter to be changed to a value that is input through the input unit 7I and is from among the machine end adjustment parameters that are set to the machine end corrector 1f.

The memory 7M of the input device 7 can store a plurality of different machine end adjustment parameters. In this case, the processor 7P of the input device 7 can read the machine end adjustment parameter from the memory 7M to input the parameter to the machine end corrector 1f and change the machine end adjustment parameter set to the machine end corrector 1f.

The machine end correction signal increases the amplitude of vibration at the motor position to decrease the amplitude of vibration at the machine end relative position. The adder 1g adds the error suppression signal output from the error suppression compensator 1a to the machine end correction signal output from the machine end corrector 1f so as to generate the driving signal of the motor 2 and then outputs the signal to the motor 2.

Figure 3:
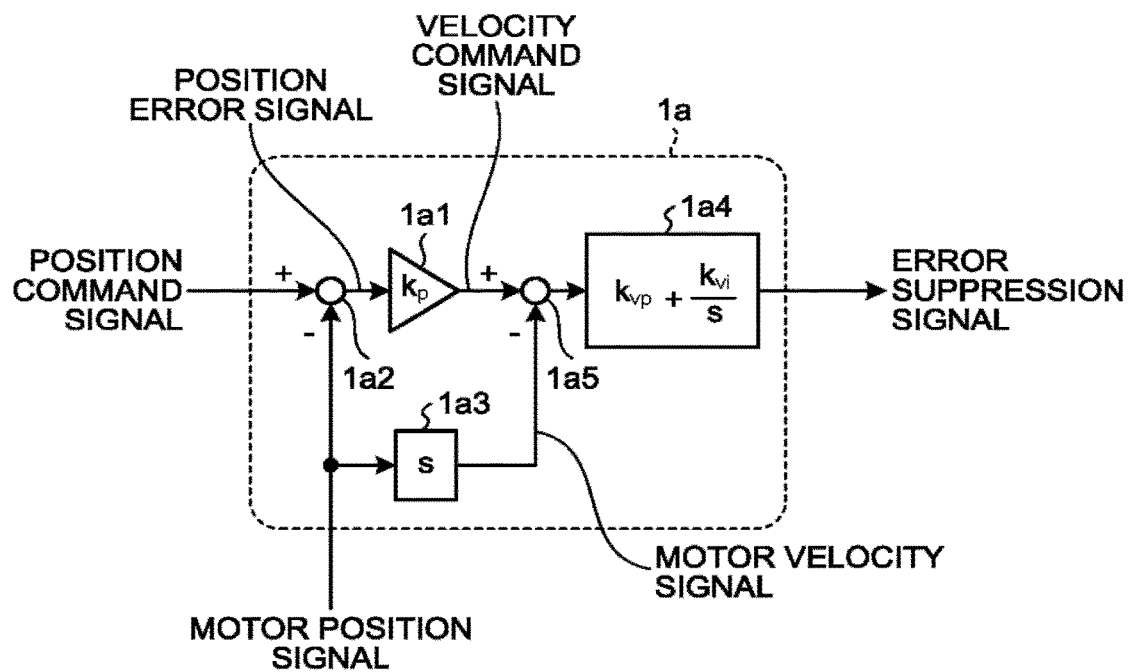
FIG. 3 is a diagram illustrating the configuration of an error suppression compensator of the motor controller according to the first embodiment.

FIG. 3 is a diagram illustrating the configuration of the error suppression compensator of the motor controller according to the first embodiment. The "s" in FIG. 3 represents a Laplace operator. The error suppression compensator 1a includes a position compensator 1a1, a subtractor 1a2, a differentiator 1a3, a velocity compensator 1a4, and a subtractor 1a5. The position error signal output from the subtractor 1a2 is input to the position compensator 1a1. The position compensator 1a1 multiplies the position error signal being input by a position proportional gain $k_p$ to generate a velocity command signal and then outputs the signal to the subtractor 1a5. The subtractor 1a2 obtains the position error signal by subtracting the motor position signal detected by the position sensor 1b of FIG. 2 from the position command signal.

The differentiator 1a3 differentiates the motor position signal that has been input to generate a motor velocity signal and then outputs the signal to the subtractor 1a5. The velocity compensator 1a4 performs a proportional operation using a velocity proportional gain $k_{vp}$ as well as an integral operation using a velocity integral gain $k_{vi}$ on a velocity error signal output from the subtractor 1a5 to generate and then output the error suppression signal that reduces the steady-state error of the velocity error signal. The subtractor 1ay subtracts the motor velocity signal output by the differentiator 1a3 from the velocity command signal output by the position compensator 1a1 and thus generates the velocity error signal, and it then outputs the signal to the velocity compensator 1a4.

The error suppression compensator 1a of the motor controller 1 calculates and outputs the error suppression signal for driving the motor 2 such that the position error signal equals zero. When the position command signal input to control positioning of the mover 2b of the motor 2 changes abruptly and at the same time the stand 4 on which the stator 2a of the motor 2 is mounted has low stiffness, the reaction force of the movable part 3 attached to the mover 2b of the motor 2 is transmitted to the stand 4. As a result, the stand 4 vibrates in the direction of a drive axis of the movable part 3, or it vibrates in the direction parallel to the direction of movement of the mover 2b of the motor 2. The direction of movement of the mover 2b corresponds to the longitudinal direction of the stator 2a of the motor 2.

The vibration of the stand 4 causes vibration of the stator 2a of the motor 2 and the work object 5 set up on the stand 4, which as a result, causes vibration at the motor position, which is the relative position between the stator 2a and the mover 2b, and causes the machine end relative position, which is the relative position between the machine end 3b of the working machine 3c and the work object 5. The motor controller 1 acquires the stand vibration signal that is information on the vibration of the upper stand 4b, which is the vibration of the stator 2a and is detected by the vibration sensor 1c set up on the upper stand 4b. The motor controller 1 uses the acceleration extractor 1d to extract the acceleration component of the natural frequency of the stand 4, and then it uses the acceleration compensator 1e to multiply the component by the proportional gain corresponding to the inertia of the movable part 3 and obtains the proportional compensation signal.

The machine end corrector 1f of the first embodiment corrects the proportional compensation signal by changing the amplitude and phase of the proportional compensation signal output from the acceleration compensator 1e. The machine end corrector 1f does not change the amplitude or phase of the proportional compensation signal if the transfer function of the machine end corrector 1f equals one. The machine end corrector 1f thus adds the proportional compensation signal, as is, to the error suppression signal that drives the motor 2, such that the movable part 3 follows the movement of the stator 2a vibrations. As a result of this operation, the motor controller 1 can decrease or preferably zero the amplitude of vibration at the motor position that is the relative position between the stator 2a and the mover 2b.

The lower stand 4c illustrated in FIG. 1 has vibration characteristics different from the upper stand 4b in some cases. An example of such a case is a case where the stand 4 vibrates in the rocking mode but the stand rotates about the leveling bolts 4a. If the lower stand 4c has vibration characteristics different from the upper stand 4b, then the amplitude of vibration at the machine end relative position, which is the relative position between the machine end 3b and the work object 5, does not equal zero. This is the case even when the amplitude of vibration at the motor position, which is the relative position between the stator 2a and the mover 2b, is decreased to zero.

In order to decrease the amplitude of vibration at the machine end relative position, the motor controller 1 uses the machine end adjustment parameter, which is a numerical value input from outside the motor controller 1, to increase the amplitude of vibration at the motor position and at the same time decrease the amplitude of vibration at the machine end relative position. The machine end corrector 1f thus corrects the proportional compensation signal by changing the amplitude and phase of the proportional compensation signal in response to the machine end adjustment parameter. This is because, when the amplitude of the vibration at the machine end relative still exists even after zeroing the amplitude of the vibration at the motor position, the motor 2 needs to be driven to further operate the movable part 3 in order to decrease the remaining vibration at the machine end relative position. The remaining vibration at the machine end relative position corresponds to an amount of correction at the position of the machine end 3b of the working machine 3c required to decrease the amplitude of the vibration at the machine end relative position.

If it is assumed that the transfer function of the machine end corrector 1f equals one and that the proportional gain to which the acceleration compensator 1e is set is increased by an amount more than that corresponding to the inertia of the movable part 3 or only the amplitude of the proportional compensation signal is increased without changing the phase thereof, then the error suppression compensator 1a generates the error suppression signal so as to suppress the position error signal generated when the movable part 3 is driven by the machine end correction signal output from the machine end corrector 1f. The motor controller 1 thus cannot zero the amplitude of vibration at the machine end relative position.

Furthermore, the machine end corrector 1f of the motor controller 1 drives the motor 2 so as to further operate the movable part 3 starting from a state where the amplitude of vibration at the motor position is zero. The machine end adjustment parameter is changed in order to do this. Specifically, the machine end adjustment parameter is increased or decreased to change the phase as well as the amplitude of the proportional compensation signal. This allows the motor controller 1 to generate a driving signal that increases the amplitude of vibration at the motor position and decreases the amplitude of vibration at the machine end relative position.

The way of generating the driving signal is described more specifically here. The machine end corrector 1f generates the machine end correction signal such that the operation at the motor position is in synchronization with the operation of the stand 4 or such that vibration at the motor position is in phase with vibration of the stand. The amplitude of the vibration at the machine end relative position can be decreased as a result. The machine end corrector 1f calculates the machine end correction signal such that a second order derivative of the motor position signal is in synchronization with an acceleration signal of the stand 4.

The machine end corrector 1f of the first embodiment is configured such that the transfer function of the machine end corrector 1f has a characteristic obtained by multiplying the machine end adjustment parameter by the inverse of a closed loop transfer characteristic derived from the driving signal of the industrial machine 100 output from the motor controller 1 to the motor position signal and then adding one to the product of the multiplication. By doing this, the machine end corrector 1f obtains the machine end correction signal by changing the amplitude and phase of the proportional compensation signal such that the second order derivative of the motor position signal is operated in synchronization with the acceleration or more specifically in synchronization with the acceleration signal of the stand 4, thereby increasing the amplitude of vibration at the motor position. The motor controller 1 can also adjust the amplitude of the motor position signal by the machine end adjustment parameter that is input from the input device 7 illustrated in FIG. 2. The motor controller 1 can thus decrease or preferably bring to zero the vibration at the machine end relative position by properly setting the machine end adjustment parameter.

The inverse of the closed loop transfer characteristic can be calculated by using an error suppression parameter that sets the transfer characteristic of the error suppression compensator 1a. The error suppression parameter of the first embodiment includes the position proportional gain $k_p$, the velocity proportional gain $k_{vp}$, and the velocity integral gain $k_{vi}$ illustrated in FIG. 3 but is not limited to these parameters. The machine end corrector 1f uses at least one of these parameters to find the amount of change in the amplitude and phase of the proportional compensation signal.

The machine end adjustment parameter used in the first embodiment is determined in advance by experiment or simulation based on the characteristic of the industrial machine 100 illustrated in FIG. 1. The transfer characteristic of the machine end corrector 1f can thus be predicted in advance in some cases. In this case, the amount of change in the amplitude and phase of the proportional compensation signal can be estimated in advance so as to be able to use a phase lead compensator or a phase delay compensator as the machine end corrector 1f instead of performing the calculation using the inverse of the closed loop transfer characteristic as described above.

With the industrial machine 100 equipped with the motor 2, the natural frequency of the stand 4 can vary depending on the position of the mover 2b. In such a case, the machine end adjustment parameter is determined in advance by experiment or simulation for different operating conditions of the motor 2 or for a plurality of different positions of the mover 2b. The machine end adjustment parameter can be stored in association with the position of the mover 2b in the memory included in the input device 7 outside the motor controller 1 or in a memory included in the motor controller 1.

An optimum value of the amount of change in the amplitude and phase of the proportional compensation signal can be determined in advance by experiment or simulation based on the characteristic of the industrial machine 100. That is, if an operator of the industrial machine 100 repeats the process of using the input device 7 to change the machine end adjustment parameter of the machine end corrector 1f and then physically driving the motor 2, then the amplitude and phase of the proportional compensation signal generated by the machine end corrector 1f can be closer to the optimum value.

Even when the stand 4 of the industrial machine 100 has low stiffness and vibrates due to the reaction force of the motor 2 set up on the stand 4, the motor controller 1 still drives the motor 2 with the driving signal obtained by adding the machine end correction signal that is obtained by changing the amplitude and phase of the proportional compensation signal generated in the machine end corrector 1f to the error suppression signal generated in the error suppression compensator 1a. The driving signal causes vibration at the motor position and decreases the amplitude of vibration at the machine end relative position, whereby the motor controller 1 can perform positioning at high speed and with high precision of the machine end 3b, which is the end corresponding to a part of the working machine 3c operating on the work object 5.

In order to simplify detection of the stand acceleration signal, the vibration sensor 1c is preferably an acceleration sensor but is not limited thereto. The vibration sensor 1c can be a velocity sensor or a displacement sensor in addition to being an acceleration sensor. The vibration sensor 1c that is a velocity sensor or displacement sensor can obtain the stand acceleration signal by differentiating the output signal of the vibration sensor 1c.

When the vibration sensor 1c is an acceleration sensor, the acceleration extractor 1d is a band-pass filter with the center frequency set to the natural frequency of the stand 4. This allows the acceleration extractor 1d to reduce the offset and high frequency noise superimposed on the stand vibration signal output from the vibration sensor 1c. The motor controller 1 can further have increased robustness against disturbance such as floor vibration and a change in the attitude of a controlled object by expanding the signal pass band of the band-pass filter.

The machine end corrector 1f can be a controller that includes a proportional compensator using a proportional gain and the band-pass filter. The use of the band-pass filter as the machine end corrector 1f is preferable because the machine end corrector 1f can change the amplitude and phase of the proportional compensation signal while at the same time reducing the offset and the high frequency noise superimposed on the proportional compensation signal.

In the first embodiment, the error suppression compensator 1a, the acceleration extractor 1d, the acceleration compensator 1e, the machine end corrector 1f, and the adder 1g included in the motor controller 1 are each implemented by a processing circuit that executes the corresponding function but can be implemented in another way as well. The functions of each of the error suppression compensator 1a, the acceleration extractor 1d, the acceleration compensator 1e, the machine end corrector 1f, and the adder 1g of the motor controller 1 can be implemented by a processor executing a program stored in a memory. Alternatively, a plurality of processors and a plurality of memories can inter-connectedly implement the functions of the motor controller 1.

The matters disclosed in the first embodiment are also applicable to the following embodiment.

Second Embodiment

Figure 4:
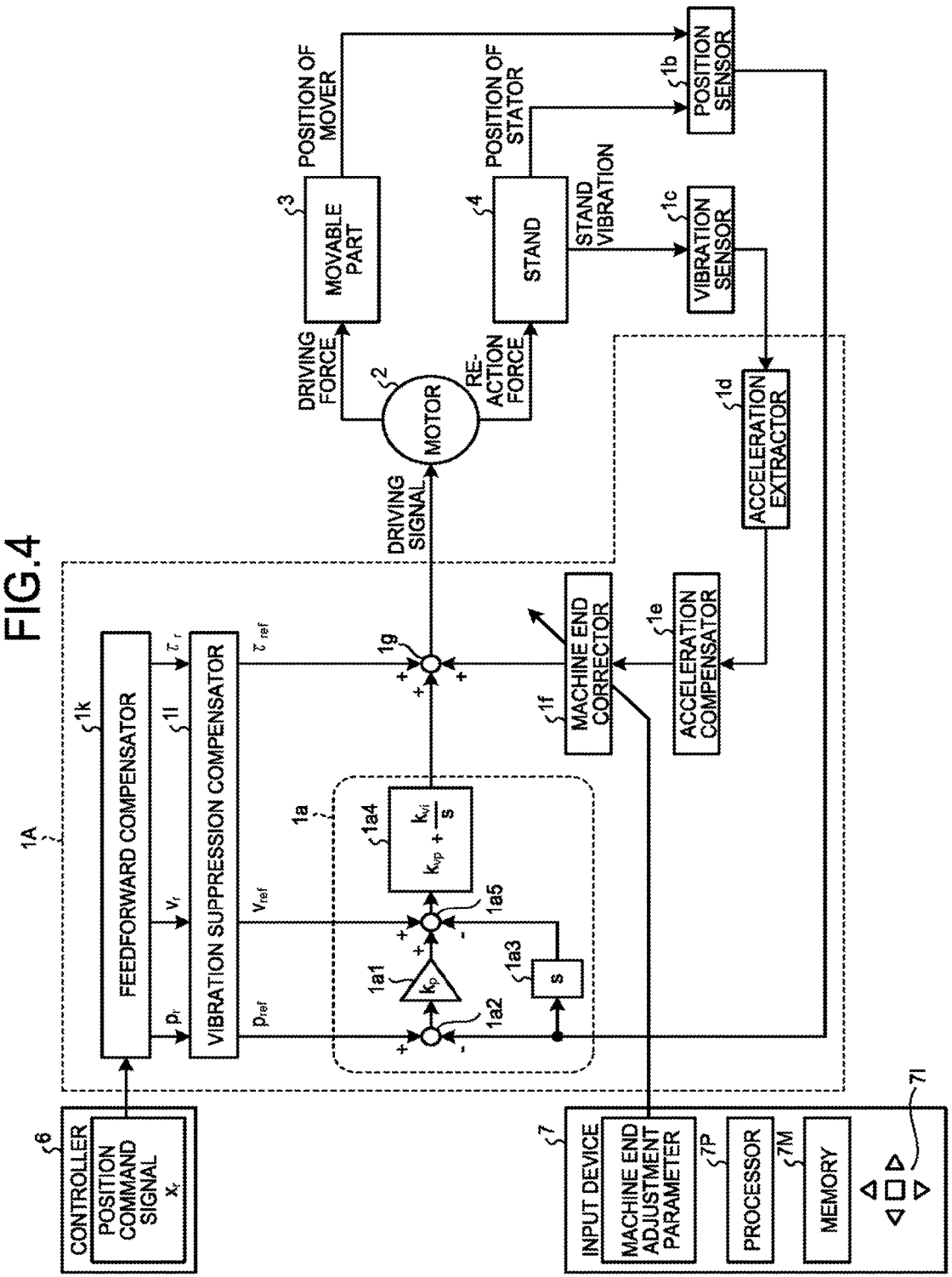
FIG. 4 is a diagram illustrating the configuration of a motor controller according to a second embodiment.

FIG. 4 is a diagram illustrating the configuration of a motor controller according to a second embodiment. A motor controller 1A of the second embodiment is configured by adding a feedforward compensator 1k, which is a feedforward compensation unit, and a vibration suppression compensator 1l, which is a vibration suppression compensation unit to the configuration of the motor controller 1 of the first embodiment. The rest of the motor controller 1A is similar to the motor controller 1 of the first embodiment so that the descriptions on the similar part will be omitted as appropriate. There will now be described a case where the motor controller 1A controls a motor 2 of an industrial machine 100 illustrated in FIG. 1.

The feedforward compensator 1k imparts a low-pass characteristic to a position command signal $x_r$ to generate a model position signal $p_r$, a model velocity signal $v_r$, and a model driving force signal $\tau_r$ and output these signals to the vibration suppression compensator 1l. Transfer functions from the position command signal $x_r$ to the model position signal $p_r$, the model velocity signal $v_r$, and the model driving force signal $\tau_r$ are expressed by expressions (1), (2), and (3). An $M_h$ in expression (3) represents inertia of a movable part.

[Expression 1]

$$\frac{p_r}{x_r} = F(s) \quad (1)$$

[Expression 2]

$$\frac{v_r}{x_r} = sF(s) \quad (2)$$

[Expression 3]

$$\frac{\tau_r}{x_r} = M_h s^2 F(s) \quad (3)$$

An F (s) indicating the low-pass characteristic can be expressed by expression (4) while using coefficients $f_0$ to $f_4$.

[Expression 4]

$$F(s) = \frac{1}{f_4 s^4 + f_3 s^3 + f_2 s^2 + f_1 s^1 + f_0} \quad (4)$$

The vibration suppression compensator 1l imparts a notch characteristic $F_{n1}$ centered at an anti-resonant frequency of a stand 4 in FIG. 1 to the model position signal $p_r$ and the model velocity signal $v_r$ that are output from the feedforward compensator 1k, and imparts a notch characteristic $F_{n2}$ centered at a resonant frequency of the stand 4 to the model driving force signal $\tau_r$, thereby generating and outputting a position reference signal $p_{ref}$, a velocity reference signal $v_{ref}$, and a driving force reference signal $\tau_{ref}$. A transfer function of the notch characteristic $F_{n1}$ is expressed by expression (5), and a transfer function of the notch characteristic $F_{n2}$ is expressed by expression (6). In the expressions, $\Omega_{p1}$ and $\Omega_{z1}$ represent the resonant frequency and the anti-resonant frequency of the stand vibration characteristic, and $\zeta_{p1}$ and $\zeta_{p1}$ represent attenuation coefficients of the notch characteristics $F_{n1}$ and $F_{n2}$. The anti-resonant frequency of the stand 4 is a frequency corresponding to the maximum value of a mechanical impedance of the stand 4, and the resonant frequency of the stand 4 is a frequency corresponding to the minimum value of the mechanical impedance of the stand 4.

[Expression 5]

$$F_{n1}(s) = \frac{1}{\Omega_{z1}^2} s^2 + 2\frac{\zeta_{z1}}{\Omega_{z1}} s + 1 \quad (5)$$

[Expression 6]

$$F_{n2}(s) = \frac{1}{\Omega_{p1}^2} s^2 + 2\frac{\zeta_{p1}}{\Omega_{p1}} s + 1 \quad (6)$$

The vibration suppression compensator 1l imparts the notch characteristic $F_{n1}$ centered at the anti-resonant frequency of the stand vibration characteristic to the model position signal $p_r$ and the model velocity signal $v_r$ output from the feedforward compensator 1k. The vibration suppression compensator 1l imparts the notch characteristic $F_{n2}$ centered at the resonant frequency to the model driving force signal $\tau_r$. As a result of these processing, the vibration suppression compensator 1l generates and outputs the position reference signal $p_{ref}$, the velocity reference signal $v_{ref}$, and the driving force reference signal $\tau_{ref}$.

The position reference signal $p_{ref}$ output from the vibration suppression compensator 1l is input to a subtractor 1a2 of an error suppression compensator 1a, and the velocity reference signal $v_{ref}$ is input to a subtractor 1ay of the error suppression compensator 1a. The driving force reference signal $\tau_{ref}$ is input to an adder 1g. The adder 1g adds an error suppression signal output from the error suppression compensator 1a, a machine end correction signal output from a machine end corrector 1f, and the driving force reference signal $\tau_{ref}$ to generate a driving signal of the motor 2 and output the signal to the motor 2.

The subtractor 1a2 obtains a position error signal by subtracting a motor position signal detected by a position sensor 1b from the position reference signal $p_{ref}$. The subtractor 1a5 adds a velocity command signal output from a position compensator 1a1 and the velocity reference signal $v_{ref}$ as well as subtracts a motor velocity signal output from a differentiator 1a3 from a result of the addition to generate a velocity error signal and output the signal to a velocity compensator 1a4. The error suppression compensator 1a thus generates and outputs the error suppression signal from the position reference signal $p_{ref}$ and the velocity reference signal $v_{ref}$.

The coefficients $f_0$ to $f_4$ determining the low-pass characteristic are set according to the characteristic of a controlled object, so that the feedforward compensator 1k outputs the model position signal $p_r$, the model velocity signal $v_r$, and the model driving force signal $\tau_r$ based on the mechanical characteristic of the controlled object. The motor controller 1A equipped with the feedforward compensator 1k can thus have increased responsiveness in positioning control performed on a mover 2b of the motor 2 in response to the position command signal $x_r$. The vibration suppression compensator 1l removes a component corresponding to the natural frequency of the stand 4 illustrated in FIG. 1 from the model position signal $p_r$, the model velocity signal $v_r$, and the model driving force signal $\tau_r$. The motor controller 1A equipped with the vibration suppression compensator 1l can thus drive the mover 2b while suppressing the occurrence of the natural frequency of the stand 4.

In the industrial machine 100 illustrated in FIG. 1, the center of gravity of the entire mechanical system is shifted according to the position of the mover 2b of the motor 2. Accordingly, when the motor controller 1A controls the motor 2 of the industrial machine 100, the true values of the resonant frequency $\Omega_{p1}$ and the anti-resonant frequency $\Omega_{z1}$ which are the setting parameters of the vibration suppression compensator 1l are not fixed, in which case the stand 4 can vibrate due to reduced robustness against a change in the setting parameters.

The vibration of the stand 4 causes vibration of a stator 2a of the motor 2 set up on the stand 4 and vibration of a work object 5 placed on a lower stand 4c. This, as a result, causes vibration at a motor position, which is a relative position between the stator 2a and the mover 2b, and at a machine end relative position, which is a relative position between a machine end 3b and the work object 5. The vibration suppression compensator 1l calculates the signal for driving the motor 2 on the basis of the output from the feedforward compensator 1k and thus cannot suppress vibration of the stand 4 caused by a disturbance such as floor vibration.

The machine end corrector 1f included in the motor controller 1A obtains the driving signal of the motor 2 by using a signal, namely a stand vibration signal, output from a vibration sensor 1c set up on the stand 4. The motor controller 1A adopts a wide signal extraction band for an acceleration extractor 1d to be able to suppress vibration at the machine end relative position even when the robustness against a change in the setting parameters of the vibration suppression compensator 1l is decreased or when the stand 4 vibrates due to a disturbance such as floor vibration.

As has been described, the motor controller 1A includes the feedforward compensator 1k that increases responsiveness in the positioning control, and the vibration suppression compensator 1l that generates the output signal of the feedforward compensator 1k so as to suppress the occurrence of vibration of the stand 4. The motor controller 1A can thus have increased robustness against a disturbance such as floor vibration and a change in the attitude in a control system controlling vibration at the machine end relative position.

In the second embodiment, the error suppression compensator 1a, the acceleration extractor 1d, an acceleration compensator 1e, the machine end corrector 1f, the adder 1g, the feedforward compensator 1k, and the vibration suppression compensator 1l included in the motor controller 1A are each implemented by a processing circuit that executes the corresponding function but can be implemented in another way as well. The function of each of the error suppression compensator 1a, the acceleration extractor 1d, the acceleration compensator 1e, the machine end corrector 1f, the adder 1g, the feedforward compensator 1k, and the vibration suppression compensator 1l included in the motor controller 1A can be implemented by a processor executing a program stored in a memory. Alternatively, a plurality of processors and a plurality of memories can inter-connectedly implement the functions of the motor controller 1A.

The machine end corrector 1f of the first embodiment outputs the machine end correction signal obtained by changing the amplitude and phase of the proportional compensation signal, increases the amplitude of vibration at the motor position, and then decreases the amplitude of vibration at the machine end relative position. The machine end corrector 1f of the second embodiment outputs the machine end correction signal obtained by changing the amplitude of the proportional compensation signal in response to a change in a machine end adjustment parameter input from the outside, increases the amplitude of vibration at the motor position, and then decreases the amplitude of vibration at the machine end relative position. That is, the machine end corrector 1f outputs the machine end correction signal obtained by changing at least the amplitude of the proportional compensation signal, increases the amplitude of vibration at the motor position, and then decreases the amplitude of vibration at the machine end relative position. The matters disclosed in the second embodiment are also applicable to the following embodiment.

Third Embodiment

Figure 5:
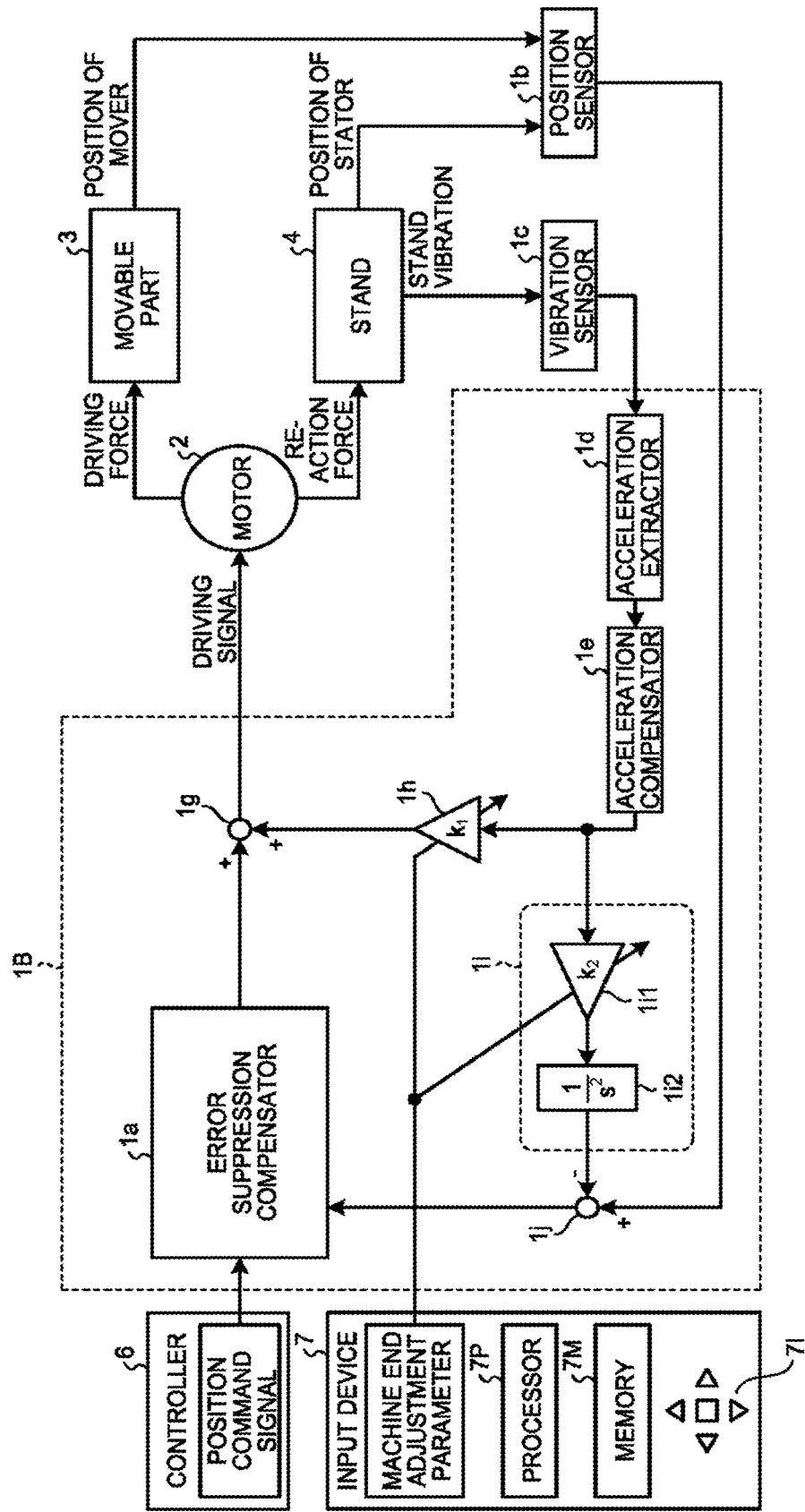
FIG. 5 is a diagram illustrating the configuration of a motor controller according to a third embodiment.

FIG. 5 is a diagram illustrating the configuration of a motor controller according to a third embodiment. Signals input to a proportional compensator 1h, an integral compensator 1i, a subtractor 1j, and an error suppression compensator 1a of a motor controller 1B of the third embodiment are different from those of the motor controller 1 according to the first embodiment. The rest of the motor controller 1B that is similar to the motor controller 1 of the first embodiment so that a description on the similar part will be omitted as appropriate. There will now be described a case where the motor controller 1B controls a motor 2 of an industrial machine 100 illustrated in FIG. 1.

The motor controller 1B includes an acceleration extractor 1d, an acceleration compensator 1e, the proportional compensator 1h, the integral compensator 1i, the subtractor 1j, the error suppression compensator 1a, and an adder 1g. The acceleration extractor 1d is an acceleration extraction unit. The proportional compensator 1h is a proportional compensation unit that outputs a machine end correction signal obtained by changing the amplitude of a proportional compensation signal from the acceleration compensator 1e such that the signal has a characteristic specified by a first gain $k_1$. The integral compensator 1i is an integral compensation unit that performs a proportional operation and a second order integral operation on the proportional compensation signal by a second gain $k_2$ and an integrator 1i2 which is a second order integration unit, and outputs a result of the operations. The subtractor 1j is a subtraction unit that subtracts an output signal of the integral compensator 1i from a motor position signal and outputs a position correction signal. The error suppression compensator 1a is an error suppression compensation unit that outputs an error suppression signal for driving the motor 2 such that a difference between a position command signal and the position correction signal equals zero. The adder 1g is an addition unit that outputs a signal obtained by adding the machine end correction signal to the error suppression signal as a driving signal of the motor 2.

The proportional compensator 1h receives input of the proportional compensation signal output from the acceleration compensator 1e, and outputs the machine end correction signal obtained by changing the amplitude of the proportional compensation signal by the first gain $k_1$ that is changed by a machine end adjustment parameter. The integral compensator 1i includes an adjustment gain 1i1 and the integrator 1i2. The integral compensator 1i receives input of the proportional compensation signal output from the acceleration compensator 1e, performs a proportional operation by the second gain $k_2$ that is changed by the machine end adjustment parameter, and performs the second order integral operation on a result of the proportional operation. The machine end adjustment parameter changes the first gain $k_1$ of the proportional compensator 1h and the second gain $k_2$ of the adjustment gain 1i1 as described above. The subtractor 1j subtracts the output signal of the integral compensator 1i from the motor position signal and outputs the position correction signal to the error suppression compensator 1a.

The error suppression compensator 1a subtracts the position correction signal from the position command signal to generate a position error signal. The error suppression compensator 1a can instead subtract the position command signal from the position correction signal to generate the position error signal. The error suppression compensator 1a outputs, to the adder 1g, the error suppression signal calculated by using an error suppression parameter that is preset to suppress the position error signal, particularly to zero the position error signal.

The motor controller 1B assumes that a stand 4 of the industrial machine 100 illustrated in FIG. 1 vibrates in a rocking mode. The motor controller 1B sets up an acceleration sensor as a vibration sensor on an upper stand 4b to decrease the amplitude of vibration at a machine end relative position, which is a relative position between a machine end 3b of a working machine 3c and a work object 5.

When the upper stand 4b and a lower stand 4c undergo damped vibration at the same natural frequency in the industrial machine 100 illustrated in FIG. 1, the time waveform of vibration $x_b$ of the upper stand 4b can be expressed by expression (7), and the time waveform of vibration $x_s$ of the lower stand 4c can be expressed by expression (8). Note that $C_b$ in expression (7) and $C_s$ in expression (8) can be expressed by expressions (9) and (10), respectively.

[Expression 7]

$$x_b(t) = C_b \cos(\omega_n \sqrt{1-\zeta_b^2} t - \Phi_b) \quad (7)$$

[Expression 8]

$$x_s(t) = C_s \cos(\omega_n \sqrt{1-\zeta_s^2} t - \Phi_s) \quad (8)$$

[Expression 9]

$$C_b = A_b e^{-\zeta_b \omega_n t} \quad (9)$$

[Expression 10]

$$C_s = A_s e^{-\zeta_s \omega_n t} \quad (10)$$

In the expressions, t represents elapsed time, $C_b$ represents the amplitude of vibration of the upper stand 4b, $C_s$ represents the amplitude of vibration of the lower stand 4c, $A_b$ represents the maximum amplitude of vibration of the upper stand 4b, $A_s$ represents the maximum amplitude of vibration of the lower stand 4c, $\omega_n$ represents the natural frequency of the stand 4, $\zeta_b$ represents an attenuation coefficient of stand vibration of the upper stand 4b, $\zeta_s$ represents an attenuation coefficient of stand vibration of the lower stand 4c, $\varphi_b$ represents an initial phase angle of the upper stand 4b, and $\varphi_s$ represents an initial phase angle of the lower stand 4c. When the stand 4 vibrates in the rocking mode, it is assumed that the upper stand 4b and the lower stand 4c are in phase and have the attenuation coefficients and $\zeta_b$ that $\zeta_s$ are equal. This means $\varphi_b = \varphi_s$ and $\zeta_b = \zeta_s$ in expressions (7) to (10), and a rate of transmission $k_m$ (=$x_s/x_b$) of vibration from the upper stand 4b to the lower stand 4c is expressed by expression (11). The rate of transmission $k_m$ of vibration from the upper stand 4b to the lower stand 4c will be hereinafter referred to as a vibration transmission rate $k_m$ as deemed appropriate.

[Expression 11]

$$k_m = \frac{A_s}{A_b} \quad (11)$$

From expression (11), the vibration transmission rate $k_m$ is determined by a ratio of the maximum amplitude of vibration $A_b$ of the upper stand 4b to the maximum amplitude of vibration $A_s$ of the lower stand 4c. The proportional compensator 1h of the third embodiment changes the first gain $k_1$ by using the machine end adjustment parameter to result in the value of the vibration transmission rate $k_m$ determined by expression (11). This is to estimate the vibration acceleration of the work object 5 set up on the lower stand 4c by using a vibration sensor 1c set up on the upper stand 4b, and then obtain a driving signal that drives a movable part 3 by the amount corresponding to vibration of the work object 5.

However, the driving signal obtained in this manner is a signal that drives the motor 2 to make the movable part 3 follow the work object 5 set up on the lower stand 4c, not a signal that drives the motor 2 to make the movable part 3 follow the upper stand 4b. This causes oscillation of a motor position signal detected by a position sensor 1b of the motor 2. Assuming that the second gain $k_2$ of the adjustment gain 1i1 equals zero, the error suppression compensator 1a drives the motor 2 so as to suppress oscillation of the motor position signal, thereby causing interference of actions between the proportional compensator 1h and the error suppression compensator 1a.

In order to correct the interference, the integral compensator 1i sets the second gain $k_2$ changed by the machine end adjustment parameter to a proportional compensation signal. The machine end adjustment parameter is set to the value of the vibration transmission rate $k_m$ in the third embodiment as described above, so that the second gain $k_2$ is set to a value that is obtained by dividing a value obtained by subtracting one from the vibration transmission rate $k_m$ by inertia of the movable part 3 set to the acceleration compensator 1e. This allows the values of both the proportional compensator 1h and the adjustment gain 1i1 to be set at the same time by the machine end adjustment parameter that is a numerical value input from the outside.

The integral compensator 1i then outputs, to the subtractor 1j, a signal obtained by using the second order integrator 1i2 to perform an integral operation from the acceleration to the order of position on the proportional compensation signal multiplied by the second gain $k_2$. The subtractor 1j then subtracts the signal obtained by the integral compensator 1i from the motor position signal and inputs the signal that is obtained as the position correction signal to the error suppression compensator 1a. Such processing eliminates the interference of the actions between the proportional compensator 1h and the error suppression compensator 1a, whereby the motor controller 1B increases vibration at the motor position to be able to generate the driving signal by which a second order derivative of the motor position signal occurs in synchronization with the acceleration of the stand. As a result, the industrial machine 100 driven by the motor controller 1B can decrease or preferably zero the amplitude of vibration at the machine end relative position.

The motor controller 1B thus increases or decreases the machine end adjustment parameter that is the numerical value input from outside the motor controller 1B to increase or decrease the first gain $k_1$ of the proportional compensator 1h and the second gain $k_2$ of the adjustment gain 1i1. Such processing allows the motor controller 1B to increase the amplitude of vibration at the motor position and at the same time decrease the amplitude of vibration at the machine end relative position.

When the stand 4 vibrates in the rocking mode with the vibration sensor 1c set up on the upper stand 4b, the motor controller 1B sets the vibration transmission rate $k_m$ as the first gain $k_1$ and uses the first gain $k_1$ to perform a proportional operation of the proportional compensation signal. The vibration transmission rate $k_m$ is the ratio of the maximum amplitude of vibration $A_b$ of the upper stand 4b to the maximum amplitude of vibration $A_s$ of the lower stand 4c. The motor controller 1B further corrects the motor position with a signal obtained by the integral compensator 1i performing an operation on the proportional correction signal. Such processing allows the motor controller 1B to generate a driving command that decreases the amplitude of vibration at the machine end relative position to zero by generating vibration at the motor position. Note that the first gain $k_1$ of the proportional compensator 1h can be set to one when the vibration sensor 1c is set up on the lower stand 4c.

In the third embodiment, the error suppression compensator 1a, the acceleration extractor 1d, the acceleration compensator 1e, the proportional compensator 1h, the adder 1g, the integral compensator 1i, and the subtractor 1j included in the motor controller 1B are each implemented by a processing circuit that executes the corresponding function but can be implemented in another way as well. The function of each of the error suppression compensator 1a, the acceleration extractor 1d, the acceleration compensator 1e, the proportional compensator 1h, the adder 1g, the integral compensator 1i, and the subtractor 1j included in the motor controller 1B can be implemented by a processor executing a program stored in a memory. Alternatively, a plurality of processors and a plurality of memories can inter-connectedly implement the functions of the motor controller 1B.

The matters disclosed in the third embodiment are also applicable to the following embodiment.

Fourth Embodiment

Figure 6:
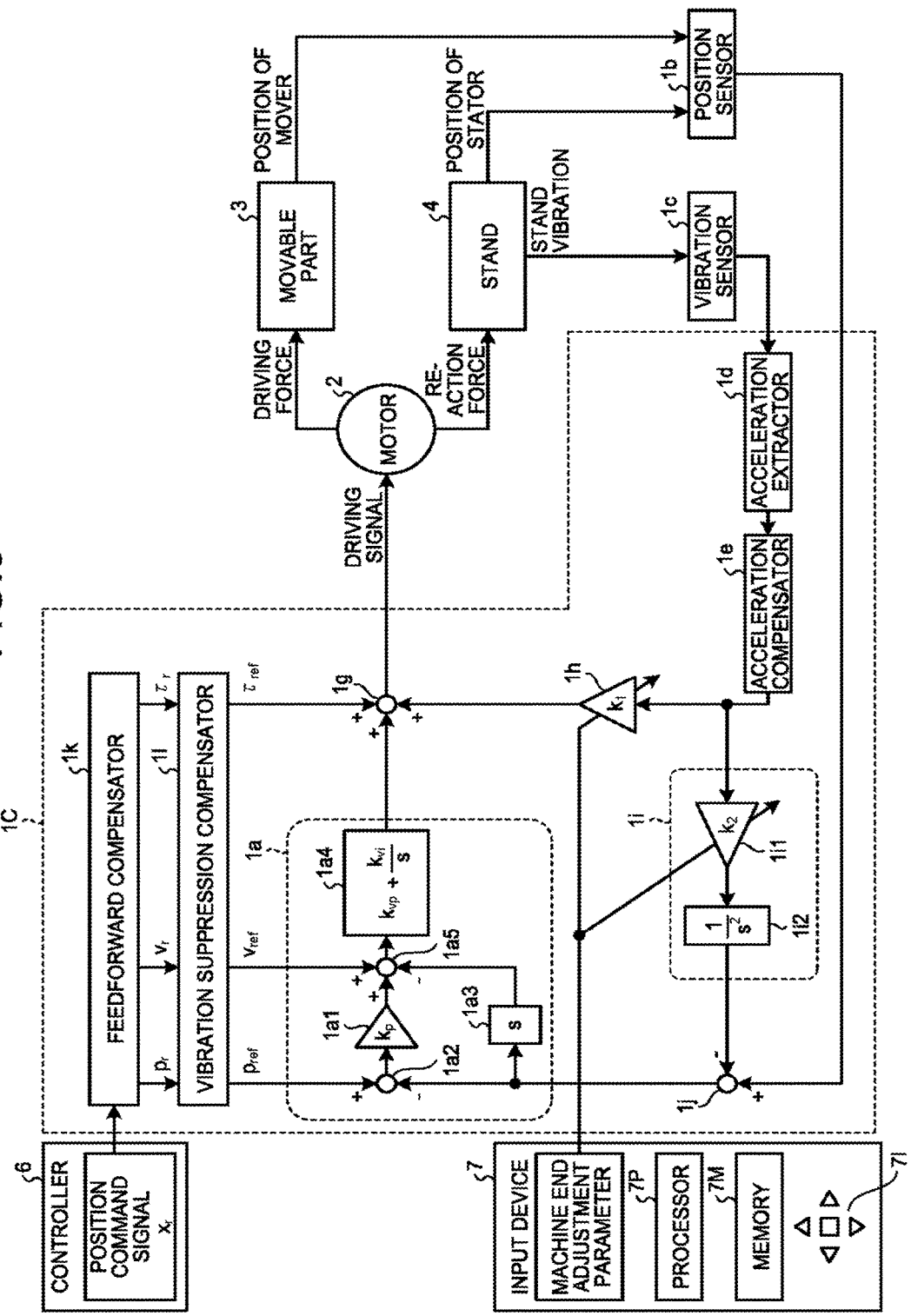
FIG. 6 is a diagram illustrating the configuration of a motor controller according to a fourth embodiment.

FIG. 6 is a diagram illustrating the configuration of a motor controller according to a fourth embodiment. A motor controller 1C of the fourth embodiment is configured by adding a feedforward compensator 1k and a vibration suppression compensator 1l of the second embodiment to the motor controller 1B of the third embodiment. The rest of the motor controller 1C is similar to the motor controller 1B of the third embodiment, so that a description on the similar part will be omitted as appropriate. There will now be described a case where the motor controller 1C controls a motor 2 of an industrial machine 100 illustrated in FIG. 1.

The feedforward compensator 1k and the vibration suppression compensator 1l are configured as described in the second embodiment. A position reference signal $p_{ref}$ output from the vibration suppression compensator 1l is input to a subtractor 1a2 of an error suppression compensator 1a, and a velocity reference signal $v_{ref}$ is input to a subtractor 1a5 of the error suppression compensator 1a. A driving force reference signal $\tau_{ref}$ is input to an adder 1g. The adder 1g adds an error suppression signal output from the error suppression compensator 1a, a machine end correction signal output from a proportional compensator 1h, and the driving force reference signal $\tau_{ref}$ to generate a driving signal of the motor 2 and output the signal to the motor 2.

The subtractor lag of the error suppression compensator 1a subtracts a position correction signal output by a subtractor 1j from the position reference signal $p_{ref}$ and obtains a position error signal. A differentiator 1a3 of the error suppression compensator 1a differentiates the position correction signal input from the subtractor 1j to generate a motor velocity signal and output the signal to the subtractor 1a5. The subtractor lay adds a velocity command signal output from a position compensator 1a1 and the velocity reference signal $v_{ref}$ as well as subtracts the motor velocity signal output by the differentiator 1a3 from a result of the addition to generate a velocity error signal and output the signal to a velocity compensator 1a4. The adder 1g of the motor controller 1C adds the error suppression signal output from the error suppression compensator 1a, the machine end correction signal output from the proportional compensator 1h, and the driving force reference signal $\tau_{ref}$ to generate the driving signal of the motor 2 and output the signal to the motor 2.

The proportional compensator 1h included in the motor controller 1C obtains the driving signal of the motor 2 by using a signal, namely a stand vibration signal, output from a vibration sensor 1c set up on a stand 4. The motor controller 1C adopts a wide signal extraction band for an acceleration extractor 1d to be able to suppress vibration at a machine end relative position even when robustness against a change in setting parameters of the vibration suppression compensator 1l is decreased or when the stand 4 vibrates due to a disturbance such as floor vibration.

The motor controller 1C includes the proportional compensator 1h, an integral compensator 1i, the feedforward compensator 1k that increases responsiveness in positioning control, and the vibration suppression compensator 1l that generates the output signal of the feedforward compensator 1k so as to suppress the occurrence of vibration of the stand 4. The motor controller 1C can thus have increased robustness against a disturbance such as floor vibration and a change in the attitude in a control system controlling vibration at the machine end relative position.

In the fourth embodiment, the error suppression compensator 1a, the acceleration extractor 1d, an acceleration compensator 1e, the proportional compensator 1h, the adder 1g, the integral compensator 1i, the subtractor 1j, the feedforward compensator 1k, and the vibration suppression compensator 1l included in the motor controller 1C are each implemented by a processing circuit that executes the corresponding function but can be implemented in another way as well. The function of each of the error suppression compensator 1a, the acceleration extractor 1d, the acceleration compensator 1e, the proportional compensator 1h, the adder 1g, the integral compensator 1i, the subtractor 1j, the feedforward compensator 1k, and the vibration suppression compensator 1l included in the motor controller 1C can be implemented by a processor executing a program stored in a memory. Alternatively, a plurality of processors and a plurality of memories can inter-connectedly implement the functions of the motor controller 1C.

The matters disclosed in the fourth embodiment are also applicable to the following embodiment.

Fifth Embodiment

Figure 7:
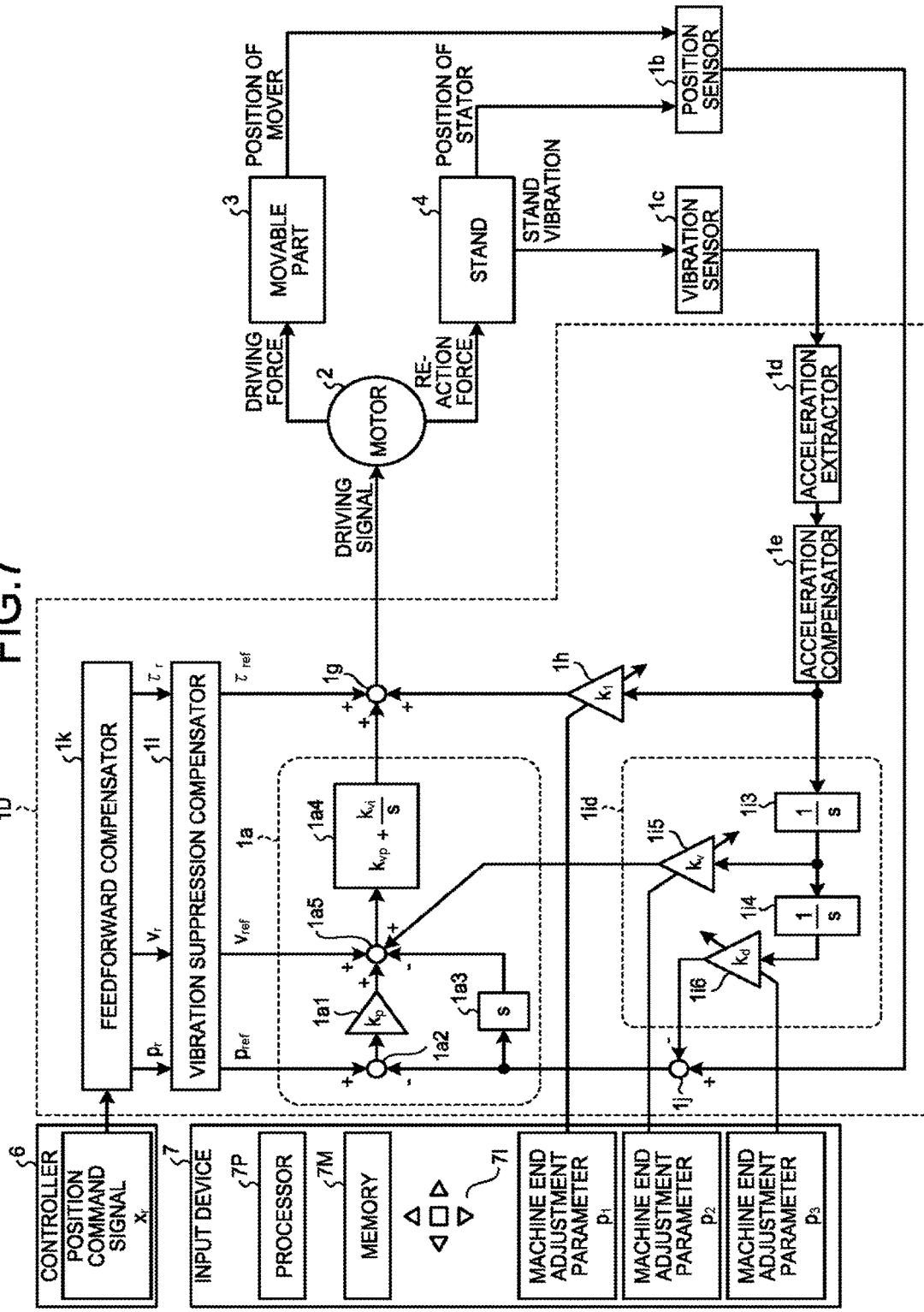
FIG. 7 is a diagram illustrating the configuration of a motor controller according to a fifth embodiment.

FIG. 7 is a diagram illustrating the configuration of a motor controller according to a fifth embodiment. A motor controller 1D of the fifth embodiment is different from the motor controller 1C of the fourth embodiment in terms of an integral compensator 1id, a subtractor 1a5 of an error suppression compensator 1a, a subtractor 1j, and the number of machine end adjustment parameters input from an input device 7. The rest of the motor controller 1D is similar to the motor controller 1C of the fourth embodiment, so that a description on the similar part will be omitted as appropriate. There will now be described a case where the motor controller 1D controls a motor 2 of an industrial machine 100 illustrated in FIG. 1.

An integral compensator 1id of the motor controller 1D includes an integrator 1i3 that is a first order integration unit, an integrator 1i4 that is a first order integration unit, an adjustment gain 1i5 that performs a proportional operation on output of the integrator 1i3, and an adjustment gain 1i6 that performs a proportional operation on output of the integrator 1i4.

The integral compensator 1id of the motor controller 1D uses the integrator 1i3 and a velocity gain $k_v$ of the adjustment gain 1i5 to perform a first order integral operation and a proportional operation on a proportional compensation signal that is output from an acceleration compensator 1e. The integral compensator 1id outputs a result of the operation as a first order integral compensation signal that is a first output of the integral compensator 1$id$, and then uses the integrator 1$i$3, the integrator 1$i$4, and a displacement gain k$_d$ of the adjustment gain 1$i$6 to perform a second order integral operation and a proportional operation on the proportional compensation signal. The integral compensator 1$id$ outputs a result of the operation as a second order integral compensation signal that is a second output of the integral compensator 1$id$.

The subtractor 1$a$5 in the error suppression compensator 1$a$ of the motor controller 1D adds a velocity command signal output from a position compensator 1$a$1 of the motor controller 1D, a velocity reference signal v$_{ref}$ output from a vibration suppression compensator 1$l$, and the first order integral compensation signal that is the first output of the integral compensator 1$id$ as well as subtracts a motor velocity signal by a differentiator 1$a$3 from a result of the addition to generate a velocity error signal and output the signal to a velocity compensator 1$a$4.

The subtractor 1$j$ of the motor controller 1D subtracts the second order integral compensation signal that is the second output of the integral compensator 1$id$ from a motor relative position signal that is a relative position between a mover and a stator of the motor 2 and detected by a position sensor 1$b$, and outputs a result of the subtraction as a position correction signal.

The input device 7 of the fifth embodiment outputs, to the motor controller 1D, a first machine end adjustment parameter p$_1$, a second machine end adjustment parameter P$_2$, and a third machine end adjustment parameter p$_3$ that are changed by an input unit 7I operated by an operator of the industrial machine 100. The motor controller 1D then uses the first machine end adjustment parameter p$_1$ to increase or decrease a first gain k$_1$, uses the second machine end adjustment parameter p$_2$ to increase or decrease the velocity gain k$_v$, and uses the third machine end adjustment parameter p$_3$ to increase or decrease the displacement gain k$_d$.

The proportional compensation signal output from the acceleration compensator 1$e$ of the motor controller 1D is a result of the proportional operation performed on a stand acceleration signal output from an acceleration extractor 1$d$ by using a proportional gain, and is thus proportional to the acceleration of a stand 4. Accordingly, the first gain k$_1$ changed by the first machine end adjustment parameter p$_1$ has a function of performing proportional compensation on the proportional compensation signal that is proportional to the acceleration of the stand 4.

The integrator 1$i$3 performs a first order integral operation on the proportional compensation signal output from the acceleration compensator 1$e$, so that the output of the integrator 1$i$3 is proportional to the velocity of the stand 4. Accordingly, the velocity gain k$_v$ changed by the second machine end adjustment parameter P$_2$ has a function of performing proportional compensation on the output of the integrator 1$i$3 that is proportional to the velocity of the stand 4.

The integrator 1$i$4 performs a first order integral operation on the output of the integrator 1$i$4, so that the output of the integrator 1$i$4 is proportional to the displacement of the stand 4. Accordingly, the displacement gain k$_d$ changed by the third machine end adjustment parameter p$_3$ has a function of performing proportional compensation on the output of the integrator 1$i$3 that is proportional to the displacement of the stand 4.

The motor controller 1D thus uses the first gain k$_1$ changed by the first machine end adjustment parameter p$_1$, the velocity gain k$_v$ changed by the second machine end adjustment parameter p$_2$, and the displacement gain k$_d$ changed by the third machine end adjustment parameter p$_3$. The functions of the first gain k$_1$, the velocity gain k$_v$, and the displacement gain k$_d$ can be clearly distinguished with respect to the physical quantities of the acceleration, the velocity, and the displacement of the stand vibration. The motor controller 1D can thus improve the precision of increasing the amplitude of vibration at the motor position and decreasing the amplitude of vibration at the machine end relative position by performing a fine adjustment on the first to third machine end adjustment parameters p$_1$, p$_2$, and p$_3$ independently.

A rate of attenuation of the stand vibration caused by reaction force and a disturbance can vary when the stand 4 is set up on a slope, a movable part 3 is positioned at a different site, or the temperature inside a room in which the stand 4 is set up is different, for example. In such a case, the second machine end adjustment parameter p$_2$ proportional to the velocity of the stand 4 can mainly be subjected to a fine adjustment to improve the precision of decreasing the amplitude of vibration at the machine end relative position.

The configurations illustrated in the aforementioned first to fifth embodiments merely illustrate an example of the content of the present invention, and can thus be combined with another known technique or partially omitted and/or modified without departing from the gist of the present invention.

REFERENCE SIGNS LIST 1, 1A, 1B, 1C, 1D motor controller, 1$a$ error suppression compensator, 1$a$1 position compensator, 1$a$2 subtractor, 1$a$3 differentiator, 1$a$4 velocity compensator, 1ay subtractor, 1$b$ position sensor, 1$c$ vibration sensor, 1$d$ acceleration extractor, 1$e$ acceleration compensator, 1$f$ machine end corrector, 1$g$ adder, 1$h$ proportional compensator, 1$i$, 1$id$ integral compensator, 1$i$1, 1$i$5, 1$i$6 adjustment gain, 1$i$2, 1$i$3, 1$i$4 integrator, 1$j$ subtractor, 1$k$ feedforward compensator, 1$l$ vibration suppression compensator, 2 motor, 2$a$ stator, 2$b$ mover, 3 movable part, 3$a$ motor end, 3$b$ machine end, 3$c$ working machine, stand, 4$a$ leveling bolt, 4$b$ upper stand, 4$bu$ upper surface, 4$c$ lower stand, 4$d$ frame, 5 work object, 6 controller, 7 input device, 100 industrial machine, F$_{n1}$, F$_{n2}$ notch characteristic, k$_1$ first gain, k$_2$ second gain, k$_d$ displacement gain, k$_v$ velocity gain, p$_1$, p$_2$, p$_3$ machine end adjustment parameter, p$_r$ model position signal, p$_{ref}$ position reference signal, v$_r$ model velocity signal, v$_{ref}$ velocity reference signal, x$_r$ position command signal, τ$_r$ model driving force signal, τ$_{ref}$ driving force reference signal, Ω$_{p1}$ resonant frequency, Ω$_{z1}$ anti-resonant frequency.

The invention claimed is:

1. A motor controller that controls a motor, the motor controller comprising:
   circuitry configured to implement
      an error suppression compensation unit to output an error suppression signal that drives the motor such that a difference, between:
         a position command signal that determines a position of a mover of the motor and
         a signal based on a motor position signal that is information on a motor position that is a relative position between the stator and the mover of the motor, equals zero;
      an acceleration extraction unit to output, as a stand acceleration signal, an acceleration component of a natural frequency from a stand vibration signal that is information on vibration of the stator;

an acceleration compensation unit to output a proportional compensation signal obtained by multiplying the stand acceleration signal by a proportional gain;
a machine end correction unit
to output a machine end correction signal obtained by changing at least an amplitude of the proportional compensation signal in response to a change in a machine end adjustment parameter input from outside, and
to decrease an amplitude of vibration at the machine end relative position, which is a relative position between the working machine connected to the mover and an operating part of the work object mechanically connected to the stator via the stand, by increasing an amplitude of vibration at the motor position; and
an addition unit to output, as a driving signal for the motor, a signal obtained by adding the machine end correction signal to the error suppression signal.

2. The motor controller according to claim 1, wherein
the error suppression compensation unit outputs an error suppression signal that drives the motor such that the difference between the position command signal and the motor position signal equals zero, and
the machine end correction unit obtains the machine end correction signal by changing the amplitude and a phase of the proportional compensation signal.

3. The motor controller according to claim 1, wherein
the machine end correction unit determines the machine end correction signal by using an error suppression parameter used when the error suppression compensation unit determines the error suppression signal.

4. The motor controller according to claim 1, wherein
the machine end correction unit includes:
a proportional compensation unit to output a machine end correction signal obtained by changing the amplitude of the proportional compensation signal in order for the signal to have a characteristic specified by a first gain;
an integral compensation unit
to perform a proportional operation and a second order integral operation on the proportional compensation signal by using a second gain and a second order integration unit and to then output a result of the operations; and
a subtraction unit
to subtract an output signal of the integral compensation unit from the motor position signal and
to then output a position correction signal, and
the error suppression compensation unit outputs an error suppression signal that drives the motor such that the difference between the position command signal and the position correction signal equals zero.

5. The motor controller according to claim 1, wherein
the machine end correction unit increases or decreases the machine end adjustment parameter, which is a numerical value input from outside the machine end correction unit, so as to increase an amplitude of vibration at the motor position and at the same time to decrease an amplitude of vibration at the machine end relative position.

6. The motor controller according to claim 1, wherein
the machine end correction unit determines the machine end correction signal such that a second order derivative of the motor position occurs in synchronization with acceleration of the stand.

7. The motor controller according to claim 1, further comprising:
a feedforward compensation unit to output a model position signal, a model velocity signal, and a model driving force signal by imparting a low-pass characteristic to the position command signal; and
a vibration suppression compensation unit to output a position reference signal, a velocity reference signal, and a driving force reference signal
by imparting a notch characteristic centered at an anti-resonant frequency of the stand to the model position signal and the model velocity signal that are output from the feedforward compensation unit, and
by imparting a notch characteristic centered at a resonant frequency of the stand to the model driving force signal, wherein
the error suppression compensation unit generates and outputs the error suppression signal from the position reference signal, the velocity reference signal, and the motor position signal, and
the addition unit outputs, as a driving signal for the motor, a signal obtained by adding the error suppression signal, the machine end correction signal, and the driving force reference signal.

8. The motor controller according to claim 1, further comprising an acceleration sensor mounted on the stand, wherein
the acceleration sensor outputs the stand vibration signal.

9. The motor controller according to claim 1, wherein
the acceleration extraction unit is a band-pass filter with a center frequency set to the natural frequency of the stand.

10. An industrial machine comprising:
a motor;
a stand to hold the motor;
a working machine to be attached to a movable part of the motor; and
the motor controller according to claim 1 to control the motor.

11. A method, implemented by a motor controller that controls a motor, the method comprising:
outputting an error suppression signal that drives the motor such that a difference, between:
a position command signal that determines a position of a mover of the motor and
a signal based on a motor position signal that is information on a motor position that is a relative position between the stator and the mover of the motor, equals zero;
outputting, as a stand acceleration signal, an acceleration component of a natural frequency from a stand vibration signal that is information on vibration of the stator;
outputting a proportional compensation signal obtained by multiplying the stand acceleration signal by a proportional gain;
outputting a machine end correction signal obtained by changing at least an amplitude of the proportional compensation signal in response to a change in a machine end adjustment parameter input from outside;
decreasing an amplitude of vibration at the machine end relative position, which is a relative position between the working machine connected to the mover and an operating part of the work object mechanically connected to the stator via the stand, by increasing an amplitude of vibration at the motor position; and outputting, as a driving signal for the motor, a signal obtained by adding the machine end correction signal to the error suppression signal.

* * * * *